May 13, 1924.

W. A. RINGLER

PERPETUAL CALENDAR

Filed Dec. 14, 1922  2 Sheets-Sheet 1

INVENTOR:
William A. Ringler
BY
Wiedersheim Fairbanks
ATTORNEYS

May 13, 1924.  W. A. RINGLER  1,494,133

PERPETUAL CALENDAR

Filed Dec. 14, 1922    2 Sheets—Sheet 2

*Fig. 5.*

| | 17 | | | | | | 18 | | | | | |
|---|---|---|---|---|---|---|---|---|---|---|---|---|
| JANUARY 31-DAYS | | | | | | | 7 | 14 | 21 | 28 | | |
| SUN MON TUES WED THUR FRI SAT | | | | | | | | | | | | |
| FEBRUARY 28-(29)-DAYS | | | | | | | 6 | 13 | 20 | 27 | | |
| SUN MON TUES WED THUR FRI SAT | | | | | | | | | | | | |
| MARCH 31-DAYS | | | | | | | 5 | 12 | 19 | 26 | | |
| SUN MON TUES WED THUR FRI SAT | | | | | | | | | | | | |
| APRIL 30-DAYS | | | | | | | 4 | 11 | 18 | 25 | | |
| SUN MON TUES WED THUR FRI SAT | | | | | | | | | | | | |
| MAY 31-DAYS | | | | | | | 3 | 10 | 17 | 24 | 31 | |
| SUN MON TUES WED THUR FRI SAT | | | | | | | | | | | | |
| JUNE 30-DAYS | | | | | | | 2 | 9 | 16 | 23 | 30 | |
| SUN MON TUES WED THUR FRI SAT | | | | | | | | | | | | |
| JULY 31-DAYS | | | | | | | 1 | 8 | 15 | 22 | 29 | |
| SUN MON TUES WED THUR FRI SAT | | | | | | | | | | | | |
| AUGUST 31-DAYS | | | | | | | 7 | 14 | 21 | 28 | | |
| SUN MON TUES WED THUR FRI SAT | | | | | | | | | | | | |
| SEPTEMBER 30-DAYS | | | | | | | 6 | 13 | 20 | 27 | | |
| SUN MON TUES WED THUR FRI SAT | | | | | | | | | | | | |
| OCTOBER 31-DAYS | | | | | | | 5 | 12 | 19 | 26 | | |
| SUN MON TUES WED THUR FRI SAT | | | | | | | | | | | | |
| NOVEMBER 30-DAYS | | | | | | | 4 | 11 | 18 | 25 | | |
| SUN MON TUES WED THUR FRI SAT | | | | | | | | | | | | |
| DECEMBER 31-DAYS | | | | | | | 3 | 10 | 17 | 24 | 31 | |
| SUN MON TUES WED THUR FRI SAT | | | | | | | | | | | | |
| DIRECTIONS | | | | | | | 2 | 9 | 16 | 23 | 30 | |

7-SPACES                    6-SPACES

INVENTOR:
William A. Ringler
BY
Niedersheim & Fairbanks
ATTORNEYS.

Patented May 13, 1924.

1,494,133

UNITED STATES PATENT OFFICE.

WILLIAM A. RINGLER, OF PHILADELPHIA, PENNSYLVANIA.

PERPETUAL CALENDAR.

Application filed December 14, 1922. Serial No. 606,777.

*To all whom it may concern:*

Be it known that I, WILLIAM A. RINGLER, a citizen of the United States, residing at Philadelphia, county of Philadelphia, State of Pennsylvania, have invented a new and useful Perpetual Calendar, of which the following is a specification.

My present invention comprehends a novel and simplified construction of a perpetual calendar which if desired can be printed on a single sheet at a minimum expense of production, the sheet having indicated thereon the months and the days of the months in sequence of seven.

It further comprehends a novel construction of a calendar wherein the sheet is scored and perforated at the same time the desired data is being printed thereon.

It further comprehends a novel arrangement of a number slip or slips indicative of the names of the months, in which the numbers are arranged in a novel manner thereon, and novel means are provided for blanking out or rendering invisible the days of the month which are not to be used.

It further consists of other novel features of construction all as will be hereinafter fully set forth.

For the purpose of illustrating my invention, I have shown in the accompanying drawings typical embodiments thereof which are at present preferred by me, since these embodiments will be found in practice to give satisfactory and reliable results. It is, however, to be understood that the various instrumentalities of which my invention consists can be variously arranged and organized, and that my invention is not limited to the precise arrangement and organization of these instrumentalities as herein shown and described.

Figure 1 represents a top plan view of a printed, scored and perforated blank from which the calendar is formed by separating and folding the strips.

Figure 2 represents a front elevation of the calendar.

Figure 3 represents a section on line 3—3 of Figure 2.

Figure 4 represents a section on line 4—4 of Figure 2.

Figure 5 represents a top plan view of another embodiment of my invention.

Figures 6 and 7 represent, respectively, the folded month and numeral strip, the ends of each of which have been secured together to form an endless strip.

Similar numerals of reference indicate corresponding parts.

Referring to the drawings,

The calendar can be formed from one or two strips and preferably formed from one for the sake of economy of manufacture.

1 designates a sheet of paper or other desired material which is provided with a weakened line 2, preferably formed by perforating the sheet, so that when separated along the perforated line a foldable strip 3, indicative of the month and the year, and a number strip 4, indicative of the days of the month, will be formed. At the left hand side of the sheet is printed or otherwise indicated thereon the names of the months of a year in consecutive order, and at the same time that the printing is done the scored or weakened lines are made which divide the sheet into monthly strips 6 and number strips 7 which are foldable on the weakened lines 5.

The folds 6 have indicated thereon, in addition to the name of a month, abbreviations 8 which are indicative of the days of the week. The folds 6 indicative of the month have also indicated thereon, as at 9, the number of days which such month ordinarily has. The strip 3 has at its top a fold 15 having indicated thereon the words "Perpetual calendar," and the bottom fold 16 has indicated thereon the direction for proper assemblage of the monthly strip 3 and the number strip 4.

The number strip 4 has indicated thereon the lines 10 which extend at right angles to the scored lines 5 so as to form spaces 11 in certain of which are indicated numbers. The bottom fold 12 of the number strip 4 has indicated thereon the directions for blanking out dates which do not occur in a month. The numbers are arranged in a novel manner on the number strip in the spaces 11, so that the proper days of the month can be provided, irrespective of the date on which the first of the month falls. The numbers are arranged from left to right in consecutive order, and, in their respective columns, each number is larger by seven than the number in the superposed space. After the number strip 4 has been separated from the monthly strip 3, it will be seen that at the left hand portion the first six spaces are blank, and the spaces are then numbered in the top row in consecutive order from 1 to 7. In the next row, the spaces are numbered in consecutive order from 2 to 14. In the next row, the spaces are numbered in consecutive order from 9 to 21. In the next row, the spaces are numbered in consecutive order from 16 to 28. In the next row, the spaces are numbered in consecutive order from 23 to 31, the last four spaces being blank. In the next row, the first two spaces are numbered 30 and 31, respectively, the other spaces in the row being blank.

In order to provide for blanking out numbers which do not appear in a month such as, for example, 29, 30 and 31, each of such spaces is provided with the cut 13, so that tabs 14 are provided, which can be turned under as indicated in Figure 4.

It will now be understood that the entire perpetual calendar is printed at the same time on one side of a sheet of material, so that the sheet appears as seen in Figure 1 with the different folds perforated, scored and other lines, days of the month, days of the week, the numbers and the direction.

It will of course be understood that, while the sheet is preferably printed, this matter can be placed thereon by embossing or any other desired operation, which will render the desired data visible on the sheet. The sheet is then separated on the weakened line 2 to provide a monthly strip 3 having the folds 6 and a number strip 4 having the folds 7.

In order to assemble the strips to form a calendar, we will assume that the month of February is to be shown, as seen in Figure 2, and that the first day of the month falls on Thursday. The number strip is assembled as shown in Figure 2, and the portions of the number strip which are not used are simply folded in back of the monthly strip 3, and the folds which have the words "January, September, October, November and December" are folded rearwardly so that they will not show.

As February has only twenty-eight days, the tabs 14 having the numbers 29, 30 and 31 are folded as shown in Figure 4 so that their numbers will not be visible.

The calendar shown in Figure 2 is then placed in a frame of any desired construction, which, if desired, may be similar to that shown in my copending application for a display frame, Serial No. 624,885, filed March 14, 1923, in which the frame is provided with inturned oppositely located flanges which form guides to receive the calendar which, if desired, may be placed in a transparent pocket, as shown in my copending application aforesaid.

It will be seen that the numbers indicative of the days of the month are arranged on the number strip in numerical sequence, so that by properly folding the strip, the first day of the month will appear beneath the proper day of the week, and when the strip is folded the days of the month will be in numerical sequence, and the two strips 3 and 4, respectively, can be adjusted so that the month of any year and the days which correspond to it will be exposed on the calendar.

In perpetual calendars as heretofore constructed, it has been deemed necessary to employ a number of separate cards or sheets with the days of the month indicated thereon in accordance with the day of the week on which the first of the month falls, in order to be able to make the proper combination.

In accordance with my present invention, I employ but two strips which can be assembled to visibly indicate the days of the month in the proper consecutive order in which they should occur, with the first day in the month falling on the proper day of the week.

It will be understood that the numeral strip has the numbers arranged thereon in columns, the seventh column being the master column, the numerals at the right of the master column progressively increasing by one in each row, and the numerals at the left of the master column progressively decreasing by one.

My invention also involves a novel method of making a perpetual calendar, wherein I simultaneously indicate on a sheet of material a column showing progressively the months of the year, with the days of the week indicated in proximity to each month, and an arrangement of numerals in columns arranged in such a manner that the days of a desired month will be indicated in numerical sequence irrespective of the day of the week on which the month falls. I preferably, at the same time, form a scored or weakened line between the monthly portion and the numeral portion in order to enable the sheets to be separated into a monthly strip and a numeral strip, which are then assembled in their adjusted positions so that they will be at right angles to each other.

I also preferably score the sheet to provide weakened lines between the different months and between the different columns of numerals, so that a monthly strip and a numeral strip can be folded on these lines.

It will thus be apparent from the foregoing that it is necessary to employ but a single sheet of material and all of the necessary data can be printed, impressed or embossed on a single sheet, with consequent economy in the cost of manufacture.

In the embodiments seen in Figures 5, 6 and 7, the construction is substantially the same as that seen in Figure 1 except that the monthly strip when folded has one more space than the numeral strip when folded, and each strip is provided with a gummed flap at each end, so that an endless monthly strip and an endless numeral strip are provided. The twelve months in the year are shown in consecutive order with a gummed flap 17, and the numeral strip has at its top a gummed flap 18, so that these strips can be secured together to form endless strips. The numeral strip when folded and assembled at right angles to the monthly strip will be of the same length as the width of the monthly strip, so that the numerals will appear beneath the days of the week. The sheet is weakened, for example, by scored lines between the different months and between the different columns of numerals, so that the construction and the arrangement of the data relating to the perpetual calendar are substantially the equivalent of that seen in Figure 1, and provision may be made for blanking out the days of the month not to be used in a similar manner to that seen in Figure 1.

It will be seen that in this embodiment there are fifteen folds on the sheet, and as the numeral sheet has seven folds visible when folded it is of the same width as the width of the monthly strip which can be folded so that seven folds are visible, and, when the numeral strip is assembled with respect to it, it will cover six folds so that the proper month will be visible above the numeral strip.

It will now be apparent that I have devised a new and useful perpetual calendar which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent, is:

1. A perpetual calendar, comprising a sheet of material having folds on which are indicated the months, and the days of the week and having folds on which are indicated the numbers 1 to 31 in superposed rows, the numbers in each row being arranged in numerical sequence, and the numbers in each row being greater by 7 than the numbers in the corresponding positions in the next superposed row.

2. A perpetual calendar formed from a single sheet of material having a weakened line to enable it to be separated into a monthly strip and a number strip, and having scored lines to form folds, the monthly strip having indicated on its folds the different months of a year and the days of the week and the number strip having indicated on its folds rows of numbers, the numbers in each row being in numerical sequence, the number in a row being greater by seven than a number in a corresponding position in the next row above it.

3. In a perpetual calendar, the combination with a foldable month strip having on the different folds words indicative of the different months and indications of the days of the week, of a number strip having rows of numbers, the numbers in a row being arranged in numerical sequence, the first six spaces in the top row being blank and the rest of the spaces in the top row having the numbers 1 to 7 in numerical sequence, the second row from the top having the numbers 2 to 14 in numerical sequence and the other rows having the numbers greater by 7 than the numbers in the corresponding positions in the next row above it.

4. A number strip for a perpetual calendar having the days of the month arranged in rows indicative of days of the week to form columns with weakened lines between the columns, the first six spaces of the top row being blank and the other spaces having numbers 1 to 7 in numerical sequence, the second row having the numbers 2 to 14 arranged in numerical sequence, the third row having the numbers 9 to 21 arranged in numerical sequence, the fourth row having the numbers 16 to 28 arranged in numerical sequence, the fifth row having the numbers 23 to 31 arranged in numerical sequence, and the sixth row having the numbers 30 and 31 arranged in consecutive order.

5. A foldable number strip for a perpetual calendar having the days of the month arranged in rows, the first six spaces of the top row being blank and the other spaces having numbers 1 to 7 in numerical sequence, the second row having the numbers 2 to 14 arranged in numerical sequence, the third row having the numbers 9 to 21 arranged in numerical sequence, the fourth row having the numbers 16 to 28 arranged in numerical sequence, the fifth row having the numbers 23 to 31 arranged in numerical sequence and the sixth row having the numbers 30 and 31 arranged in consecutive order, the numbers 29, 30 and 31 being on tabs, which can be folded to render the numbers on them invisible.

6. A number strip for perpetual calendars having 13 columns of numerals forming superimposed rows and provided with weakened lines between the columns to make provision for folding, the seventh column being the master column, the numerals in the master column progressively increasing by 7 from 1 to 29, the numerals at the right of the master column progressively increasing by one in each row and at the left of the master column progressively decreasing by 1, whereby when the strip is positioned to cause the first day of the month to fall on a specified day and show 7 columns, the numerals 1 to 31 will be shown in numerical sequence, and said strip having foldable portions to render invisible dates not occurring in a specified month.

WILLIAM A. RINGLER.

Witnesses:
H. S. FAIRBANKS,
C. D. McVAY.